(12) United States Patent
Kanayama

(10) Patent No.: US 9,513,101 B2
(45) Date of Patent: Dec. 6, 2016

(54) DISTANCE MEASUREMENT DEVICE AND DISTANCE MEASUREMENT METHOD

(71) Applicant: Mitsubishi Electric Corporation, Tokyo (JP)

(72) Inventor: Yasuto Kanayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/023,436

(22) PCT Filed: Oct. 4, 2013

(86) PCT No.: PCT/JP2013/077170
§ 371 (c)(1),
(2) Date: Mar. 21, 2016

(87) PCT Pub. No.: WO2015/049803
PCT Pub. Date: Apr. 9, 2015

(65) Prior Publication Data
US 2016/0209200 A1 Jul. 21, 2016

(51) Int. Cl.
*G01B 7/14* (2006.01)
*H04L 12/40* (2006.01)
*H04L 12/721* (2013.01)

(52) U.S. Cl.
CPC ............... *G01B 7/14* (2013.01); *H04L 12/40* (2013.01); *H04L 45/123* (2013.01)

(58) Field of Classification Search
CPC .... G01S 5/0027; G01S 5/06; G01S 2205/008; G01S 5/10; H04W 64/00
(Continued)

(56) References Cited

U.S. PATENT DOCUMENTS 5,550,807 A   8/1996  Kuroshita
5,699,255 A * 12/1997  Ellis .................... G01C 21/367
                                                340/995.12
(Continued)

FOREIGN PATENT DOCUMENTS

JP       4-289944 A   10/1992
JP       7-245614 A    9/1995
(Continued)

OTHER PUBLICATIONS

Examination Report from the Intellectual Property Office for Taiwanese Office Action Patent Application No. 103100158, dated Oct. 22, 2015.
(Continued)

*Primary Examiner* — Carol S Tsai
(74) *Attorney, Agent, or Firm* — Sughrue Mion, PLLC; Richard C. Turner

(57) ABSTRACT

A distance measurement device includes a transceiving unit that, in a distance measurement process between the distance measurement device and nodes, transmits a command to the nodes, and receives a response as a response to the command; and a distance measurement control unit that instructs the transceiving unit to transmit the command when the distance measurement process starts, measures a period of time until the response is received after the command is transmitted, and calculates a distances between the distance measurement device and the nodes on the basis of the measured period of time. The distance measurement control unit determines the number of repetitions for the distance measurement process until the distance is calculated after the command is transmitted on the basis of the calculated distance.

8 Claims, 9 Drawing Sheets

(58) Field of Classification Search
USPC ........ 702/158; 455/456.1, 424, 67.11, 404.2, 455/422.1; 342/457; 709/218, 204
See application file for complete search history.

(56) References Cited

U.S. PATENT DOCUMENTS

| | | | | |
|---|---|---|---|---|
| 5,732,354 | A * | 3/1998 | MacDonald | G01C 21/20 342/451 |
| 5,960,355 | A * | 9/1999 | Ekman | G01S 5/0009 455/456.1 |
| 6,701,132 | B1 * | 3/2004 | Fukuzawa | G01S 5/10 455/561 |
| 6,845,239 | B1 * | 1/2005 | Sato | G01S 5/0027 342/457 |
| 7,787,886 | B2 * | 8/2010 | Markhovsky | G01S 5/0294 455/456.1 |
| 7,822,424 | B2 * | 10/2010 | Markhovsky | G01S 13/74 455/456.1 |
| 8,340,595 | B2 * | 12/2012 | Lee | H04B 1/40 455/347 |
| 8,417,780 | B2 * | 4/2013 | Jennings | H04W 4/02 709/203 |
| 2005/0020279 | A1 * | 1/2005 | Markhovsky | G01S 5/12 455/456.1 |
| 2006/0012476 | A1 * | 1/2006 | Markhovsky | G01S 13/74 340/539.32 |
| 2010/0046388 | A1 | 2/2010 | Kim et al. | |

FOREIGN PATENT DOCUMENTS

| | | |
|---|---|---|
| JP | 8-190411 A | 7/1996 |
| JP | 8-202759 A | 8/1996 |
| JP | 2001-298764 A | 10/2001 |
| JP | 4058589 B2 | 3/2008 |
| JP | 2009-118041 A | 5/2009 |
| JP | 2009118041 A * | 5/2009 |
| JP | 2010-60502 A | 3/2010 |
| JP | 2011-4359 A | 1/2011 |
| JP | 5062426 B2 | 10/2012 |
| KR | 10-2010-0022267 A | 3/2010 |
| KR | 10-2012-0122027 A | 11/2012 |

OTHER PUBLICATIONS

International Search Report of PCT/JP2013/077170, dated Jan. 7, 2014. [PCT/ISA/210].
Written Opinion of PCT/JP2013/077170, dated Jan. 7, 2014. [PCT/ISA/237].
Communication, dated Apr. 19, 2016, from the Korean Intellectual Property Office in counterpart Korean application No. 10-2016-7008568.

* cited by examiner

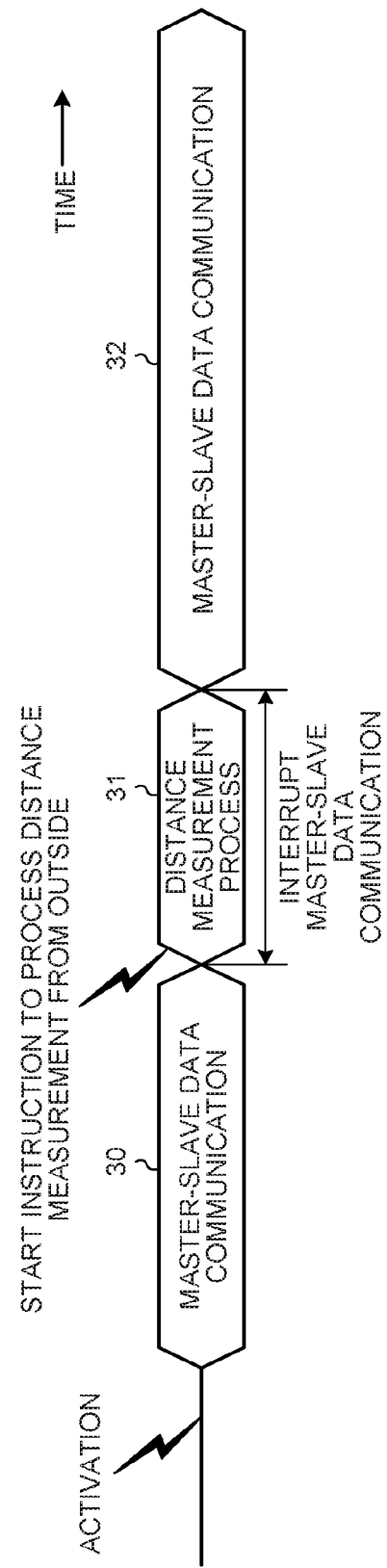

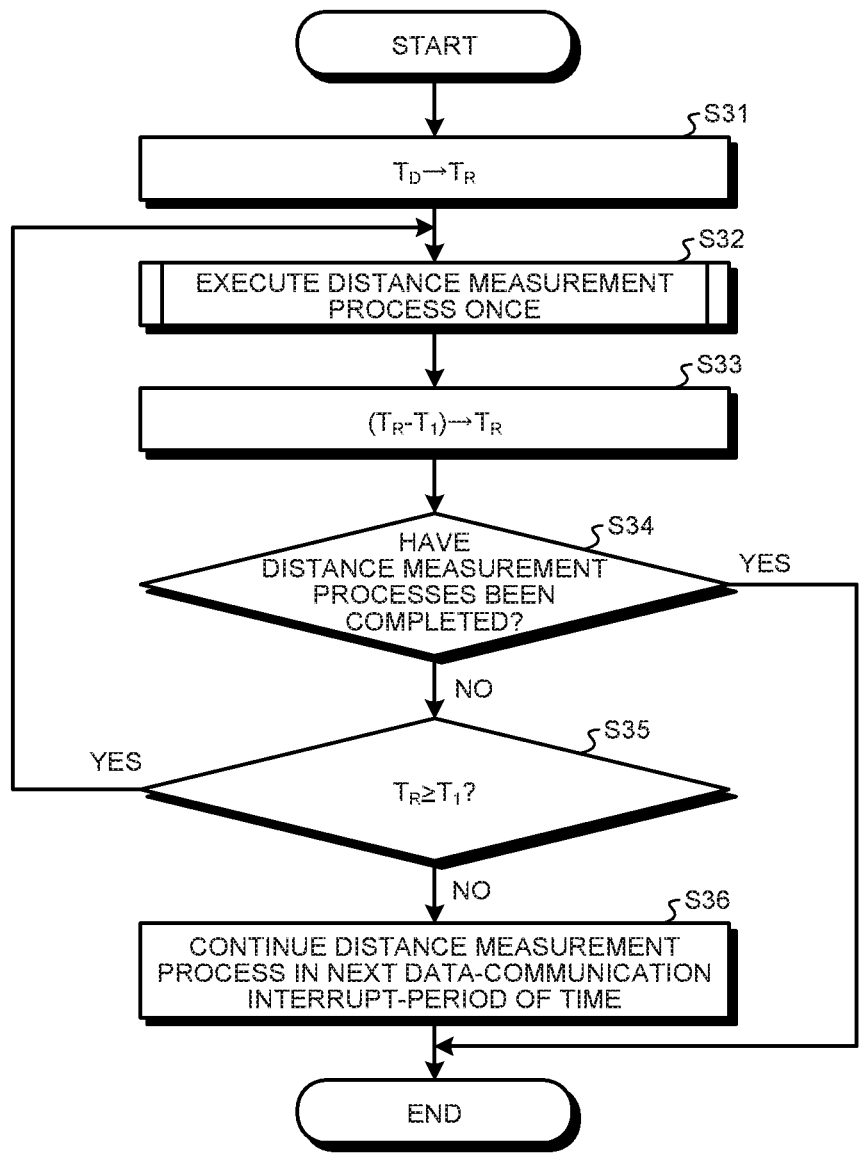

DISTANCE MEASUREMENT DEVICE AND DISTANCE MEASUREMENT METHOD

CROSS REFERENCE TO RELATED APPLICATIONS

This application is a National Stage of International Application No. PCT/JP2013/077170 filed Oct. 4, 2013, the contents of all of which are incorporated herein by reference in their entirety.

FIELD

The present invention relates to a distance measurement device and a distance measurement method.

BACKGROUND

Until now, inter-node distance measurement devices have measured the distance from a node station that is part of a bus type field network by measuring the period of time until a response is received after transmitting a command to each node station connected to a network cable and then specifying the distances to each of the node stations on the basis of the measured period of time.

In practice, because the variation in performance specific to the communication IC (integrated circuit) of each node station is large, cases occur in which the distance specified on the basis of a measured time difference between the transmitted command and the received response differs from the actual distance. To solve this problem, for example, the technique described below and disclosed in Patent Literature 1 improves the measurement accuracy by repeating the measurements multiple times (N times) and then performing an averaging process on the N measurement values obtained.

CITATION LIST

Patent Literature

Patent Literature 1: Japanese Patent Application Laid-Open No. 2009-118041

SUMMARY

Technical Problem

However, according to the technique of the related art, because the measurement is repeated multiple times (N times), there is a problem in that with this method it takes N times as long as when the measurement is made once.

The present invention was made in light of the foregoing, and it is an objective of the present invention to provide a distance measurement device and a distance measurement method that are capable of reducing a processing time when measuring a distance form a device.

Solution to Problem

In order to solve the problem and achieve the objective mentioned above, the present invention relates to a distance measurement device, that includes: a transceiving unit that, in a distance measurement process between the distance measurement device and a communication device, transmits a command to the communication device of a network system configured to include the distance measurement device and the communication device, and receives a response from the communication device as a response to the command; and a distance measurement control unit that instructs the transceiving unit to transmit the command when starting the distance measurement process, measures a period of time until the response is received after the command is transmitted, and calculates a distance between the distance measurement device and the communication device on the basis of the measured period of time. The distance measurement control unit determines, on the basis of the calculated distance, the number of times the distance measurement process, which is until the distance is calculated after the command is transmitted, is repeated.

Advantageous Effects of Invention

There is an effect in which a distance measurement device and a distance measurement method according to the present invention can reduce a processing time when a distance with a device is measured.

BRIEF DESCRIPTION OF DRAWINGS

FIG. 5-1 is a diagram illustrating a state when a start instruction to process distance measurement is received during data communication.

FIG. 5-2 is a diagram illustrating a state when a distance measurement process is executed before data communication starts.

FIG. 7-1 is a diagram illustrating a state when a distance measurement process is executed in a single data-communication interrupt-period during data communication.

FIG. 7-2 is a diagram illustrating a state when a distance measurement process is executed in a plurality of data-communication interrupt-periods during data communication.

FIG. 8 is a flowchart illustrating a distance measurement process in a distance measurement device according to a third embodiment.

DESCRIPTION OF EMBODIMENTS

Hereinafter, exemplary embodiments of a distance measurement device and a distance measurement method according to the present invention will be described in detail with reference to the appended drawings. The invention is not limited to these embodiments.

First Embodiments

Figure 1:
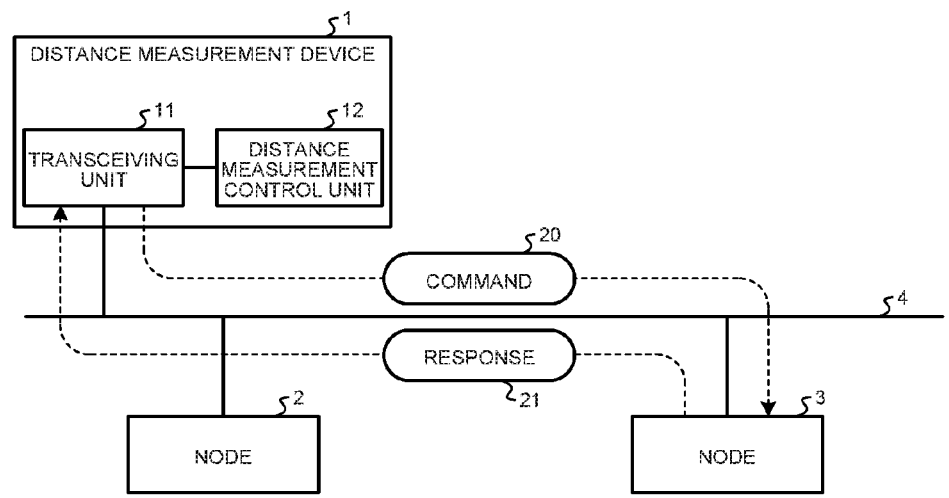
FIG. 1 is a diagram illustrating an exemplary configuration of a network system according to a first embodiment.

FIG. 1 is a diagram illustrating an exemplary configuration of a network system according to the present embodiment. In the network system, a distance measurement device 1 is connected to nodes 2 and 3 via a transmission path 4. The distance measurement device 1 is a device that measures distances from the distance measurement device 1 to the nodes 2 and 3. The nodes 2 and 3 are communication devices that are distance measurement targets for the distance measurement device 1. In FIG. 1, the two nodes represent the network system and are connected to the transmission path 4, but this is an example, and three or more nodes may be connected to the transmission path 4. FIG. 1 illustrates an example in which the distance measurement device 1 transmits a command 20 to the node 3, and receives a response 21 from the node 3 as a response thereto. Similar communication is performed between the distance measurement device 1 and the node 2.

Next, a configuration of the distance measurement device 1 will be described. The distance measurement device 1 includes a transceiving unit 11 and a distance measurement control unit 12. The transceiving unit 11 transmits the command 20 to the connected nodes 2 and 3 via the transmission path 4 by controlling the distance measurement control unit 12 when a distance measurement process starts. The transceiving unit 11 receives the response 21, which is the response to the transmitted command 20, from the nodes 2 and 3 via the transmission path 4. The command 20 is preferably a command such as a polling command or a ping command; however, the command 20 is not limited thereto. The distance measurement control unit 12 measures a transmission time of the command 20 and reception times of the responses 21, and it measures the distances between the distance measurement device 1 and the nodes 2 and 3 on the basis of time differences between the transmission time of the command 20 and the reception times of the response 21.

Next, an operation in which the distance measurement device 1 measures the distances between the distance measurement device 1 and the nodes 2 and 3 will be described. In the distance measurement device 1, first, the distance measurement control unit 12 controls the transmission of the command 20 from the transceiving unit 11 to the node 2. At this time, the distance measurement control unit 12 measures the transmission time of the command 20. Upon receiving the command 20 from the distance measurement device 1, the node 2 transmits the response 21 as a response thereto. In the distance measurement device 1, the transceiving unit 11 receives the response 21 from the node 2. At this time, the distance measurement control unit 12 measures the reception time of the response 21. The distance measurement control unit 12 can measure the period of time until the response 21 is received after the command 20 is transmitted using the transmission time of the command 20 and the reception time of the response 21 and then calculate the distance between the distance measurement device 1 and the node 2 on the basis of the measured period of time.

Specifically, since it is possible to acquire a transmission rate of the command 20 and the response 21 in the transmission path 4 in advance, the distance measurement control unit 12 can obtain a round-trip distance to the node 2 by multiplying the transmission rate by the period of time until the response 21 is received after the command 20 is transmitted, and it can obtain a one-way distance, i.e., the distance from the distance measurement device 1 to the node 2, by dividing the obtained distance by 2.

Similarly, in the distance measurement device 1, the transceiving unit 11 transmits the command 20 to the node 3, and the distance measurement control unit 12 measures the transmission time of the command 20. Upon receiving the command 20 from the distance measurement device 1, the node 3 transmits the response 21 as a response to the command 20. In the distance measurement device 1, the transceiving unit 11 receives the response 21 from the node 3, and the distance measurement control unit 12 measures the reception time of the response 21. The distance measurement control unit 12 can measure the period of time until the response 21 is received after the command 20 is transmitted using the transmission time of the command 20 and the reception time of the response 21 and then calculate the distance between the distance measurement device 1 and the node 3 on the basis of the measured period of time.

Figure 2:
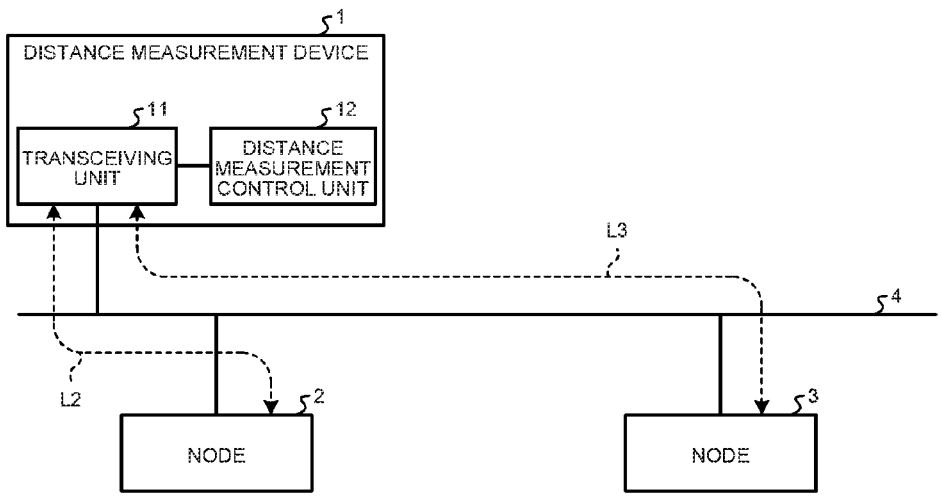
FIG. 2 is a diagram illustrating distances between a distance measurement device and nodes.

FIG. 2 is a diagram illustrating distances between the distance measurement device and the nodes. The distance measurement device 1 can obtain a distance L2 from the distance measurement device 1 to the node 2 on the basis of the period of time until the response 21 is received after the command 20 is transmitted. The distance measurement device 1 can obtain a distance L3 from the distance measurement device 1 to the node 3 on the basis of the period of time until the response 21 is received after the command 20 is transmitted. When the nodes do not need be distinguished from each other, the distance from the distance measurement device 1 to the node is indicated by a distance L.

Here, in the distance measurement process of the distance measurement device 1 and the nodes 2 and 3, the period of time (measurement result) until the response 21 is received after the command 20 is transmitted is not constant and may vary. The variation in the period of time (measurement result) until the response 21 is received after the command 20 is transmitted means that the distances of the nodes 2 and 3 calculated by the distance measurement device 1 vary. For this reason, in order to improve the measuring accuracy of the distances to the nodes 2 and 3, there is a method whereby the distance measurement device 1 repeatedly executes the distance measurement process.

The variation in the measurement result is caused by a variation in performance specific to the communication IC of each node. In the case of the distance measurement process with the node 2 connected at a short distance from the distance measurement device 1, the same level of variation occurs as in the case of the distance measurement process with the node 3 connected at a distance far from the distance measurement device 1. If a difference between an actual distance and a measured distance is indicated as a difference Ld, an error in the distance measurement process is Ld/L2 between the distance measurement device 1 and the node 2 and is Ld/L3 between the distance measurement device 1 and the node 3.

In order to adjust the error of the distance measurement process to the same degree regardless of the distance L between the distance measurement device 1 and the nodes, when the distance L is small, it is necessary to improve the accuracy of the distance measurement process by reducing Ld as well. In contrast, when the distance L is large, because the error that occurred during the distance measurement process is small, it is not necessary to improve the accuracy of the distance measurement process.

In this manner, in the present embodiment, when the distance L obtained from a first measurement result or a plurality of measurement results is smaller than a prescribed distance X, the distance measurement device 1 increases the number N of repetitions for the distance measurement process and thus it improves the accuracy of the distance measurement process. In contrast, when the obtained distance L is larger than the distance X, the distance measurement device 1 reduces the number of repetitions for the distance measurement process or does not repeat the distance measurement process. As described above, when the obtained distance L is larger than the distance X, the distance measurement device 1 reduces the number of repetitions for the distance measurement process or does not repeat the distance measurement process and thus it can reduce the time taken by the distance measurement process such that it is smaller than when the distance measurement process is repeatedly performed on all the nodes regardless of the distance from the node.

Figure 3:
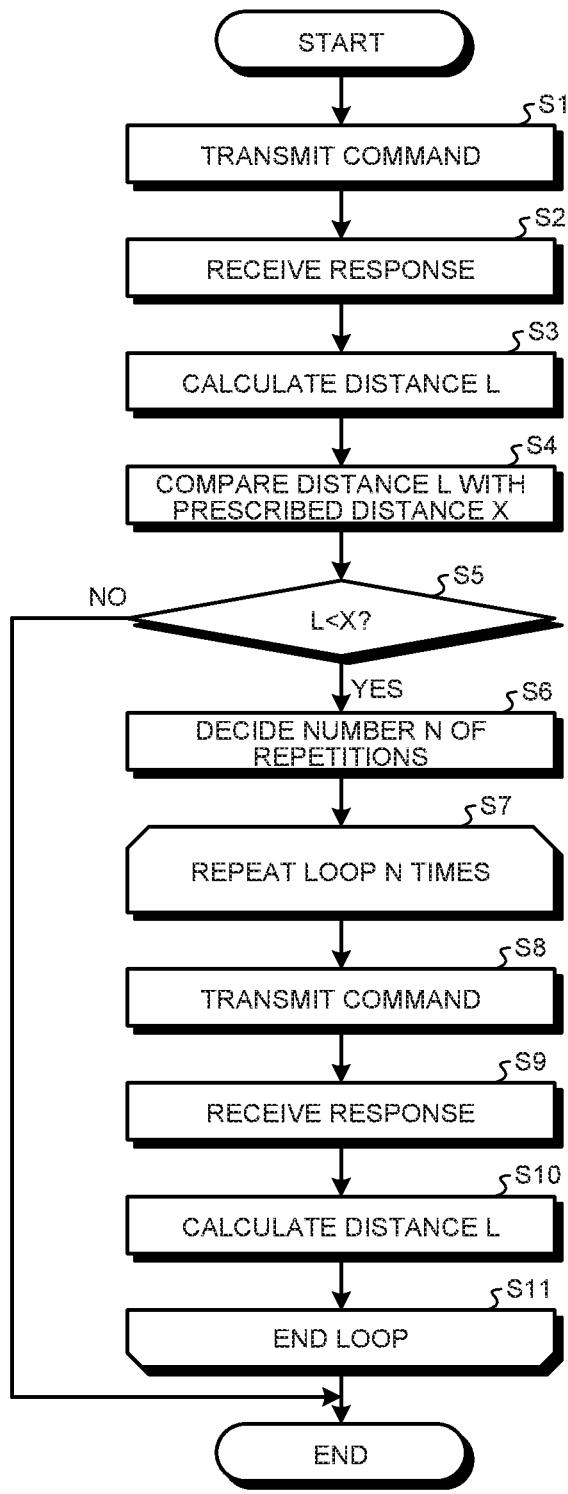
FIG. 3 is a flowchart illustrating a distance measurement process in the distance measurement device according to the first embodiment.

FIG. 3 is a flowchart illustrating the distance measurement process in the distance measurement device according to the present embodiment. As described above, when the transceiving unit 11 transmits the command 20 to the node under the control of the distance measurement control unit 12 (step S1), the distance measurement device 1 receives the response 21 as a response to the command 20 from the node that has received the command 20 (step S2).

The distance measurement control unit 12 calculates the distance L between the distance measurement device 1 and the node on the basis of the transmission time of the command 20 and the reception time of the response 21 (step S3), and it compares the distance L with the prescribed distance X (step S4). When the calculated distance L is smaller than the distance X (step S5: Yes), the distance measurement control unit 12 determines that the distance from the node is short, and thus it is necessary to improve the accuracy of the distance measurement process, and it then determines the number N of repetitions for the distance measurement process (step S6). Then, similar to the process of steps S1 to S3, the distance measurement device 1 transmits the command 20 (step S8), receives the response 21 (step S9), and repeats the distance measurement process N times (step S7) until the distance L is calculated (step S10). The distance measurement device 1 ends the distance measurement process when the distance measurement process has been repeated N times (step S11).

In contrast, when the calculated distance L is equal to or larger than the distance X (step S5: No), the distance measurement control unit 12 determines that it is unnecessary to repeat the distance measurement process because the distance from the node is long, and it is not necessary to improve the accuracy of the distance measurement process. Thus, the distance measurement device 1 ends the distance measurement process.

As described above, according to the present embodiment, in the distance measurement device 1, the distance measurement control unit 12 compares the measured distance L between the distance measurement device 1 and the node with the prescribed distance X; repeatedly executes the distance measurement process when the measured distance L from the node is smaller than X; and does not repeatedly execute the distance measurement process when the measured distance from the node is larger than X. As a result, it is possible to reduce the number of distance measurement processes for the node that is far away so that the number of processes is smaller than that for the node that is closer. Therefore, it is possible to reduce the time taken by the distance measurement process such that it is less than the time taken when the distance measurement process is repeatedly performed on all the nodes.

Further, in the present embodiment, the distance measurement control unit 12 determines the number of distance measurement processes on the basis of a comparison between the obtained distance L and the distance X. However, for example, the number of distance measurement processes may be determined by setting a plurality of values to be compared with the distance L so as to compare the distance L with a plurality of distance values (for example, a distance X1 and a distance X2). In the case of the comparison with the distances X1 and X2, the distance measurement device 1 can set the number of repetitions for the distance measurement process to three steps including no repetition, N1 repetitions, and N2 repetitions.

Second Embodiment

The present embodiment will be described in connection with an example in which a network system is configured to have a master station and slave stations, and data communication is performed between the master station and the slave stations. The parts different from those of the first embodiment will be described.

Figure 4:
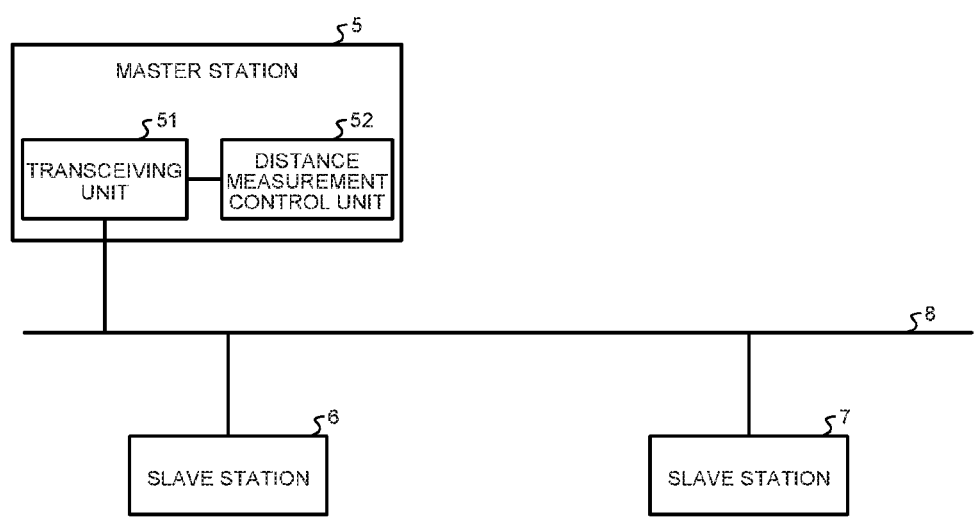
FIG. 4 is a diagram illustrating an exemplary configuration of a network system according to a second embodiment.

FIG. 4 is a diagram illustrating an exemplary configuration of a network system according to the present embodiment. In the network system, a master station 5 is connected to slave stations 6 and 7 via a transmission path 8. The master station 5 performs data communication with the slave stations 6 and 7. In the present embodiment, the master station 5 functions as the distance measurement device, and it measures the distances between the master station 5 and the slave stations 6 and 7. The slave stations 6 and 7 are communication devices functioning as a target for the distance measurement from the master station 5. In FIG. 4, the two slave stations are part the network system and are connected to the transmission path 8, but this is an example, and three or more slave stations may be connected to the transmission path 8. Although not illustrated, the master station 5 performs the distance measurement process by transmitting a command to the slave stations 6 and 7 and receiving responses from the slave stations 6 and 7.

Next, a configuration of the master station 5 will be described. The master station 5 includes a transceiving unit 51 and a distance measurement control unit 52. The transceiving unit 51 transmits the command to the connected slave stations 6 and 7 via the transmission path 8 under the control of the distance measurement control unit 52 when the distance measurement process starts. The transceiving unit 51 receives the responses as the response to the transmitted command from the slave stations 6 and 7 via the transmission path 8. The distance measurement control unit 52 measures the transmission time of the command and the reception times of the responses, and measures the distances between the master station 5 and the slave stations 6 and 7 on the basis of the time differences between the transmission time of the command and the reception times of the responses.

An operation in which the master station 5 measures the distances between the master station 5 and the slave stations 6 and 7 will be described here. In the network system according to the present embodiment, when a normal operation is performed, data communication is performed between the master station 5 and the slave stations 6 and 7. Here, when a start instruction to process distance measurement is given by an outside source during data communication, in the network system, it is necessary to interrupt the data communication. For this reason, in the present embodiment, the master station 5 executes the distance measurement process when the master station 5 is activated without waiting for a start instruction to process distance measurement from an outside source.

Figures 2, 5:
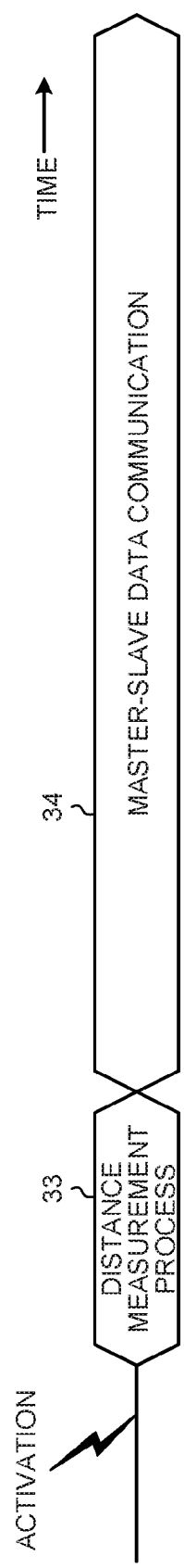

FIG. 5-1 is a diagram illustrating a state when the start instruction to process distance measurement is received during data communication. FIG. 5-2 is a diagram illustrating a state when the distance measurement process is executed before data communication starts. As illustrated in FIG. 5-1, when the start instruction to process distance measurement is received during data communication, the master station 5 interrupts master-slave data communication 30, performs a distance measurement process 31, and performs master-slave data communication 32 after the distance measurement process 31 ends. In contrast, as illustrated in FIG. 5-2, after being activated, the master station 5 performs a distance measurement process 33 before data communication starts, i.e., not waiting for an instruction from an outside source, and thus preventing master-slave data communication 34 from being interrupted.

Figure 6:
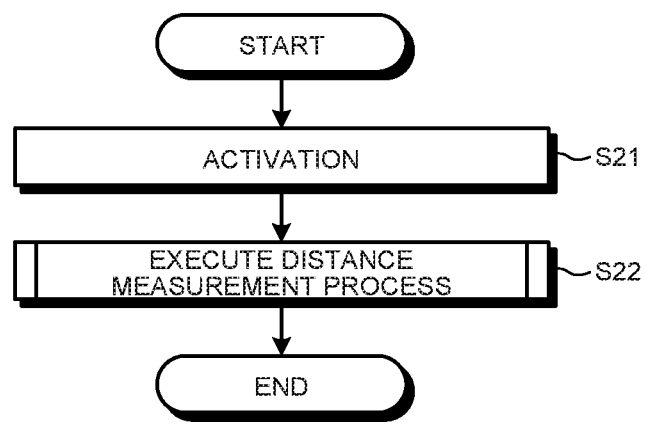
FIG. 6 is a flowchart illustrating a distance measurement process in a distance measurement device according to the second embodiment.

FIG. 6 is a flowchart illustrating a distance measurement process in the distance measurement device according to the present embodiment. In the master station 5, when the master station 5 is activated (step S21), the distance measurement control unit 52 executes the distance measurement process with the slave station (step S22). The distance measurement process at step S22 is similar to the distance measurement process (see the flowchart of FIG. 3) of the first embodiment. In the description of the first embodiment, the distance measurement device 1 is read as the master station 5, the node is read as the slave station, the distance measurement control unit 12 is read as the distance measurement control unit 52, and the transceiving unit 11 is read as the transceiving unit 51. Further, in the following description, when the master station 5 performs a similar process to the distance measurement process (the flowchart of FIG. 3) of the first embodiment, a similar replacement is assumed to be performed.

As described above, according to the present embodiment, after being activated, the master station 5 performs the distance measurement process with the slave station before data communication with the slave station starts. Accordingly, in the network system, it is possible to prevent the master-slave data communication from being interrupted.

Third Embodiment

In the present embodiment, when the distance measurement process is executed twice or more, a plurality of distance measurement processes are performed separately rather than continuously. The network system according to the present embodiment and the master station 5 has a similar configuration to that in the second embodiment (see FIG. 4).

In the network system illustrated in FIG. 4, when the distance measurement process is performed after master-slave data communication starts other than while being activated, it is necessary to interrupt the data communication temporarily. In such a case, when the number of repetitions for the distance measurement process is large, a data-communication interrupt-period of time is long. For this reason, in the present embodiment, when the distance measurement process is repeated and thus executed twice or more, the master station 5 distributes the distance measurement processes to two or more periods for distance measurement process and performs the distance measurement processes in the two or more distance measurement process periods of time, and thus reduces a single data-communication interrupt-period of time.

Figures 1, 7:
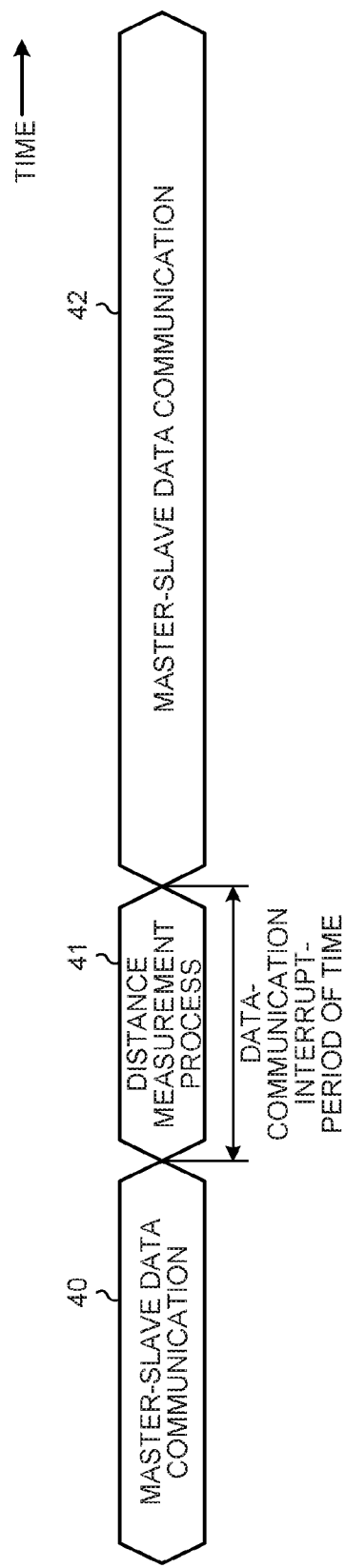
Figures 2, 7:
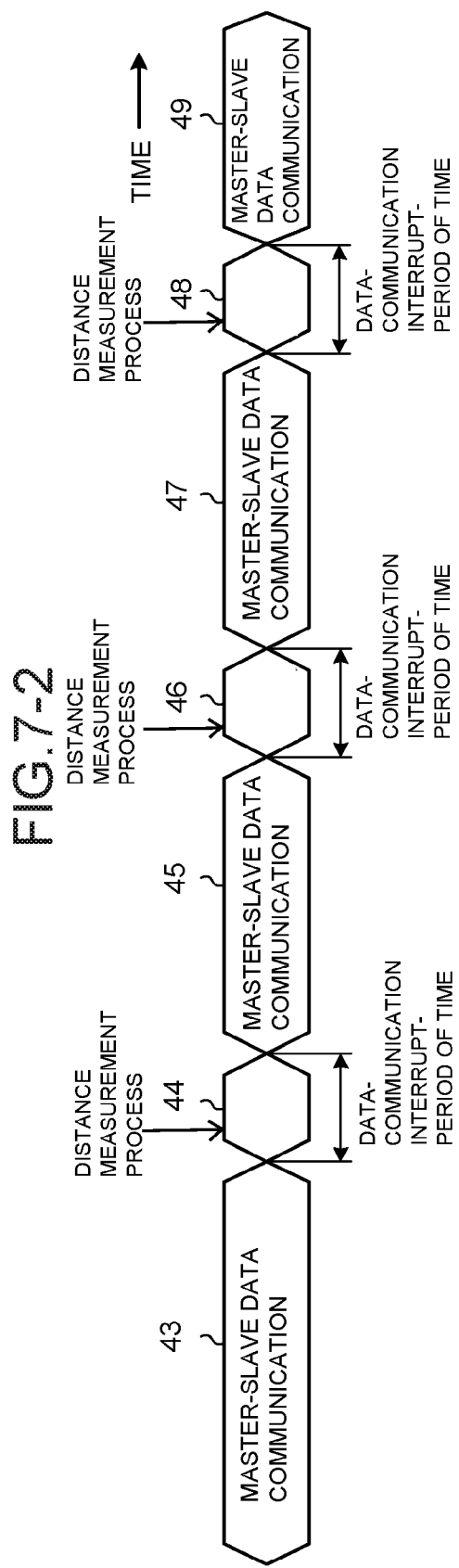

FIG. 7-1 is a diagram illustrating a state in which the distance measurement process is executed in a single data-communication interrupt-period during data communication. FIG. 7-2 is a diagram illustrating a state when the distance measurement process is executed in a plurality of data communication periods during data communication. As illustrated in FIG. 7-1, when master-slave data communication 40 is interrupted, and a distance measurement process 41 is performed, and if the distance measurement process is repeatedly executed twice or more in a single data-communication interrupt-period of time (distance measurement process period of time), it is likely that a data-communication interrupt-period of time is lengthy, and subsequent master-slave data communication 42 is delayed, so that normal data communication is influenced. In contrast, as illustrated in FIG. 7-2, the master station 5 executes the distance measurement process within a pre-given period time $T_D$ in which a single distributed process is executable, that is, within the data-communication interrupt-period of time, and for example, when N distance measurement processes are repeated, if the N distance measurement processes are not completed, the distance measurement process is continued on an occasion of a next distance measurement process (in a next communication interrupt period of time). For example, a distance measurement process 44 is performed after master-slave data communication 43, a distance measurement process 46 is performed again after master-slave data communication 45 when the distance measurement processes have not been completed by the distance measurement process 44; a distance measurement process 48 is performed again after master-slave data communication 47 when the distance measurement processes have not been completed by the distance measurement process 46; and when a plurality of distance measurement processes have been completed by the distance measurement process 48, then master-slave data communication 49 is continued.

For example, as the network system, a CC-Link (control & communication link) of an open field network (field bus) is assumed, and cyclic communication in which master-slave data communication is repeatedly executed consistently is assumed. In the cyclic communication, the master station 5 and all the slave stations 6 and 7 transmit data of their own stations, but a data communication delay time is influenced by a cyclic period. In order to perform the cyclic communication within a delay time required by the user or the system, it is necessary to reduce a period of time taken for "the cyclic period+the data communication delay time" to be within a required delay time. Thus, when the cyclic period is short, the data communication delay time can be set to be long; but when the cyclic period is long, the data communication delay time is set to be short. The period of time $T_D$, which is executable time period within a single divided processing described above, corresponds to the data communication delay time.

In the cyclic communication, because a time point at which all of the master station 5 and the slave stations 6 and 7 have completed data transmission is appropriate, the master station 5 starts the distance measurement process after this time point.

Further, when the cyclic communication is assumed, in FIG. 7-2, and when the master-slave data communication is divided by the distance measurement process, the master-slave data communications are set to the same length. But the present invention is not limited thereto. For example, the length of the master-slave data communication may be set to an arbitrary length according to the user's setting.

FIG. 8 is a flowchart illustrating the distance measurement process in the distance measurement device according to the present embodiment. In the master station 5, the distance measurement control unit 52 obtains a remaining period of time $T_R$ in which the distance measurement process is executable in a single data-communication interrupt-period of time on the basis of the period of time $T_D$ in which the single distributed process is executable. When the distance measurement process has not been executed in the data-communication interrupt-period of time yet, the period of time $T_D$ in which the single distributed process is executable is preferably set as the remaining period of time $T_R$ in which the distance measurement process is executable (step S31).

Then, the master station 5 executes the distance measurement process once (step S32). The distance measurement process at step S32 is similar to steps S8 to S10 in the distance measurement process (see the flowchart of FIG. 3) of the first embodiment. Then, the distance measurement control unit 52 sets a value obtained by subtracting a single distance measurement process period of time $T_1$ from the remaining period of time $T_R$ in which the distance measurement process is executable as a new remaining period of time $T_R$ in which the distance measurement process is executable (step S33). When the distance measurement processes have not been completed (step S34: No), that is, when the N distance measurement processes have not ended when the distance measurement process is repeated N times, the distance measurement control unit 52 then compare the remaining period of time $T_R$ in which the distance measurement process is executable with the single distance measurement process period of time $T_1$ (step S35). When the remaining period of time $T_R$ in which the distance measurement process is executable is equal or larger than the single distance measurement process period of time $T_1$ (step S35: Yes), the distance measurement control unit 52 determines that a period of time in which the distance measurement process is executable remains, returns to step S32, and executes the distance measurement process once (step S32).

The distance measurement control unit 52 executes steps S33 and S34 as described above, and when the remaining period of time $T_R$ in which the distance measurement process is executable is smaller than the single distance measurement process period of time $T_1$ (step S35: No), the distance measurement control unit 52 determines that a period of time in which the distance measurement process is executable does not remain, and the distance measurement process has to be continued in a next period of time $T_D$ in which the single distributed process is executable, that is, in a data-communication interrupt-period of time (step S36), and ends the distance measurement process.

Further, when the distance measurement processes have been completed (step S34: Yes), that is, when the N distance measurement processes have ended when the distance measurement process is repeated N times, the distance measurement control unit 52 ends the distance measurement process.

As described above, according to the present embodiment, when the distance measurement process is repeatedly executed N times, after data communication with the slave station starts, instead of executing the N distance measurement processes in the single data-communication interrupt-period of time, in the master station 5, executes the N distance measurement processes over a plurality of data-communication interrupt-periods of time. As a result, when communication is periodically performed such as cyclic communication between the master station and the slave station, it is possible to reduce a temporal interrupt period of time of the cyclic communication and reduce influence of a delay or the like affecting the communication cycle of the cyclic communication.

The period of time $T_D$ in which the single distributed process is executable may be a prescribed value as a fixed value in the master station 5 or may be calculated by the master station 5 on the basis of the communication cycle (cycle time) of the cyclic communication in the network system.

For example, a fixe value that is specified in advance is used as the period of time $T_D$ in which the single distributed process is executable as described above.

Alternatively, a fixed value per unit time is used as the period of time $T_D$ in which the single distributed process is executable. For example, 10 ms per second is used as the period of time $T_D$ in which the single distributed process is executable.

Alternatively, a fixed value with respect to the cycle of the cyclic communication of the network system is used as the period of time $T_D$ in which the single distributed process is executable. For example, a period of time of 1 ms per M cyclic communications (M is a natural number of 1 or more) of the network system is used as the period of time $T_D$ in which the single distributed process is executable.

Alternatively, a ratio with respect to a master-slave data communication period of time of the network system is used as the period of time $T_D$ in which the single distributed process is executable. For example, when the ratio of the data communication and the distance measurement process is 9:1, 10 ms per data communication 90 ms is used as the period of time $T_D$ in which the single distributed process is executable.

As described above, the period of time $T_D$ in which the single distributed process is executable can appropriately be determined, for example, in view of communication being performed in the network system.

The present embodiment has been described on the basis of the second embodiment, but the present embodiment is not limited thereto and is applicable to the first embodiment.

INDUSTRIAL APPLICABILITY

As described above, a distance measurement device and an inter-device distance measurement method according to the present invention are useful for a network system and, particularly, suitable when a plurality of nodes are connected.

REFERENCE SIGNS LIST 1 distance measurement device, 2, 3 node, 4, 8 transmission path, 5 master station, 6, 7 slave station, 11, 51 transceiving unit, 12, 52 distance measurement control unit

The invention claimed is:
1. A distance measurement device, comprising:
a transceiver that, in a distance measurement process between the distance measurement device and a communication device,
transmits a command to the communication device of a network system configured to include the distance measurement device and the communication device, and
receives a response from the communication device as a response to the command; and
a distance measurement controller that
instructs the transceiver to transmit the command when starting the distance measurement process,
measures a period of time until the response is received after the command is transmitted, and
calculates a distance between the distance measurement device and the communication device on the basis of the measured period of time, wherein, before repeatedly executing the distance measurement process, the distance measurement controller determines, on the basis of a comparison result of the calculated distance and a specified amount, the number of times the distance measurement process, which is until the distance is calculated after the command is transmitted, is repeated, wherein a communication cycle of the communication device is adjusted based on the calculated number of times the distance measurement process is repeated.

2. The distance measurement device according to claim 1, wherein the distance measurement controller executes, before data communication with the communication device is started after the distance measurement device is activated, the distance measurement process which is until the distance is calculated and after the command is transmitted, the distance measurement process being executable by interrupting the data communication after the data communication with the communication device starts.

3. The distance measurement device according to claim 1, wherein, when the distance measurement process is executed at least twice, the distance measurement controller divides a plurality of distance measurement processes into at least two distance measurement process periods of time so as to execute the divided distance measurement processes.

4. The distance measurement device according to claim 3, wherein the distance measurement controller determines a length of each distance measurement process period of time based on a cycle time of the network system.

5. A distance measurement method in a distance measurement device that constitutes a network system with a communication device, comprising:

transmitting a command to the communication device when a distance measurement process starts, wherein the communication device is connected to the distance measurement device via a communication network;

receiving a response from the communication device as a response to the command;

measuring, by the distance measurement device, a period of time until the response is received after the command is transmitted;

calculating a distance between the distance measurement device and the communication device based on the measured period of time; and before the distance measurement process is repeatedly executed, determining, based on a comparison result of the calculated distance and a specified amount, number of times the distance measurement process is repeated, wherein the distance measurement process comprises the transmitting, the receiving, the measuring, and the calculating, wherein a communication cycle of the communication device is adjusted based on the calculated number of times the distance measurement process is repeated.

6. The distance measurement method according to claim 5, wherein:

the distance measurement process from the transmitting to the measuring is executed before data communication with the communication device starts and after the distance measurement device is activated, the distance measurement process being executable by interrupting the data communication after the data communication with the communication device starts.

7. The distance measurement method according to claim 5, wherein, when the distance measurement process is executed at least twice, a plurality of distance measurement processes are divided into at least two distance measurement process periods of time so as to execute the divided distance measurement processes.

8. The distance measurement method according to claim 7, wherein a length of each distance measurement process period of time is determined on the basis of a cycle time of the network system.

* * * * *